Patented June 29, 1943

2,323,193

UNITED STATES PATENT OFFICE 2,323,193

DOUBLE COMPOUNDS OF CALCIUM SALICYCLATE WITH PYRAZOLONES

Heinrich Boie and Karl Wulzinger, Ludwigshafen-on-the-Rhine, Germany, assignors to E. Bilhuber Inc., Orange, N. J., a corporation of New Jersey No Drawing. Application August 27, 1940, Serial No. 354,394. In Germany December 24, 1938

3 Claims. (Cl. 260—311)

The invention concerns double compounds of calcium salicylate with pyrazolones.

Salicylic acid is an excellent medicine for rheumatism of focal genesis. It is, however, disadvantageous in that it does not render the vessels impermeable and in consequence thereof does not prevent toxines and bacterias from entering the blood passage.

By the presence of lime this deficiency may be compensated to a certain degree. Neutral calcium salicylate in liquid condition, however, could not be dispensed, because its solubility in water amounts to only 2.8%.

According to the present invention it has been found that valuable soluble medicines may be produced by allowing neutral calcium salicylate to act on pyrazolones in the presence of solvents or in fused state. Compounds are produced, which contain 1 molecule of neutral calcium salicylate and 2 molecules of pyrazolone.

Several processes are known for producing soluble double compounds of the pyrazolones with salicylates, for example readily soluble double compounds of phenyldimethylpyrazolone with salicylates of magnesium, tin, cadmium, lead, manganese, iron, cobalt and nickel. Although it is astonishing that calcium salicylate has never been employed, while the related magnesium salicylate has been tested, there may be two reasons for not having done so: On the one hand not all salicylic acid salts yield double compounds with phenyl dimethylpyrazolone. For example aluminium, uranium, chromium and strontium salicylate, which is especially closely related to calcium salicylate do not yield double compounds with phenyl dimethylpyrazolone. On the other hand it would be expected that calcium salicylate, which is known to be hardly soluble, could not be employed for the production of soluble compounds. The merit of the invention is to be acknowledged all the more in consideration of the fact that the inventor has overcome this restraint and it is all the more surprising that readily soluble double compounds were obtained by employing neutral calcium salicylate.

In addition the new compounds are remarkable not only for the advantageous properties of calcium salicylate, but also for the advantageous properties of the pyrazolones. Accordingly the new compounds have not only an antirheumatic effect, but improve to a high degree the impermeability of the vessels because they do not only contain lime, but also pyrazolones, which, according to the disciples of Eppinger render the vessels impermeable. The new compounds have an increased antiinfectious and temperature lowering effect at the same time.

In carrying out the invention the pyrazolone, for example dimethylaminophenyldimethylpyrazolone or phenyldimethylpyrazolone reacts with neutral calcium salicylate in the presence of water or another suitable solvent or in fused state. The components combine in double compounds according to stoichiometrical proportions, 1 molecule of neutral calcium salicylate binding 2 molecules of the pyrazolone.

The quantitative proportion may from the beginning be adjusted in such a way that only the desired double compounds are obtained. One component may, however, be added in excess and the double compound produced by treating the mixture with water be separated from the excess of the one component.

Instead of neutral calcium salicylate, calcium salicylate yielding products, for example salicylic acid and calcium oxide or calcium carbonate may be used.

The new double compounds may, almost always in an undecomposed condition, be crystallised from their concentrated aqueous solutions.

The aqueous solutions of the double compounds may easily be dosed per os as well as injected. The new double compounds are stable both as solution and tablets.

Examples (1) 35.02 parts of neutral calcium salicylate and 46.24 parts of dimethylaminophenyldimethylpyrazolone

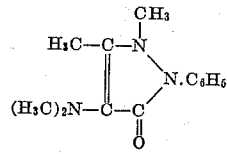

or, under the Geneva nomenclature, 4-dimethylamino-1-phenyl-2,3 dimethyl-5-pyrazolone, are moistened thoroughly with about 10 ccm. of water or alcohol and are dissolved at the temperature of the water-bath. The solution is thickened by evaporation. Initially dimethylaminophenyldimethylpyrazolone-calcium salicylate is obtained as a semi-liquid resin-like, later on as a crystalising mass, which is soluble to about 70%. The double compound crystallises without crystal water.

An excess of the dimethylaminophenyldimethylpyrazolone being employed, the filtered solution contains the components calcium salicylate and dimethylaminophenyldimethylpyrazolone according to the stoichiometrical proportion 1:2.

(2) 35.02 parts of calcium salicylate and 37.62 parts of phenyldimethylpyrazolone

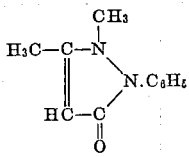

or 1-phenyl-2,3 dimethyl-5-pyrazolone, are stirred with about 70 parts of warm water. Initially an almost complete solution results, whereupon the whole mass stiffens to a thick crystal paste. After a further addition of water the crystal paste is dissolved by heating. The double compound crystallises by cooling down slowly. Phenyldimethylpyrazolonecalcium salicylate crystallises with 2 molecules of crystal water in large coarse crystals, which melt at temperatures between 106 and 108° C.

The double compound contains the components calcium salicylate and phenyldimethylpyrazolone in the stoichiometrical proportion 1:2.

(3) 10.0 parts of calcium carbonate and 27.61 parts of salicylic acid were dissolved by adding 200 parts of boiling water, whereon 37.62 parts of phenyldimethylpyrazolone or 1-phenyl-2,3 dimethyl-5-pyrazolone are added to the solution. On cooling down the double compound phenyldimethylpyrazolonecalcium salicylate crystallises.

Having now particularly described and ascertained the nature of our said invention and in what manner it is to be performed we declare that what we claim is:

1. The new water-soluble neutral and therapeutically valuable double compound consisting of 1 molecule neutral calcium salicylate and 2 molecules of 4 dimethylamino-1-phenyl-2,3-dimethyl-5-pyrazolone.

2. The new water-soluble neutral and therapeutically valuable double compound consisting of 1 molecule of neutral calcium salicylate and 2 molecules of 1-phenyl-2,3-dimethyl-5-pyrazolone.

3. The new water-soluble, neutral and therapeutically valuable double compounds of the general formula:

$$X_2 \cdot (C_6H_4OHCOO)_2Ca$$

in which X is a member of the group consisting of 1-phenyl-2,3-dimethyl-5-pyrazolone and 4-dimethylamino-1-p h e n y l-2,3-dimethyl-5-pyrazolone neutral calcium salicylate leaving the subscript 2 first above set forth indicating the presence of two mols of the aforesaid member.

HEINRICH BOIE.
KARL WULZINGER.

CERTIFICATE OF CORRECTION.

Patent No. 2,323,193.                                                                     June 29, 1943.

HEINRICH BOIE, ET AL.

It is hereby certified that error appears in the printed specification of the above numbered patent requiring correction as follows: Page 2, second column, line 18, claim 3, after the word "of" insert --neutral calcium salicylate having--; line 25, same claim, strike out "neutral calcium salicylate leaving--; and that the said Letters Patent should be read with this correction therein that the same may conform to the record of the case in the Patent Office.

Signed and sealed this 24th day of August, A. D. 1943.

Henry Van Arsdale,
(Seal)                                   Acting Commissioner of Patents.